(No Model.)

F. H. RICHARDS.
WEIGHING MACHINE.

No. 589,288. Patented Aug. 31, 1897.

Witnesses:
Chas. D. King
Fred. J. Dole

Inventor:
F. H. Richards

(No Model.) 6 Sheets—Sheet 4.

F. H. RICHARDS.
WEIGHING MACHINE.

No. 589,288. Patented Aug. 31, 1897.

Witnesses:
Chas. D. King.
Fred. J. Dole.

Inventor:
F. H. Richards (No Model.)  6 Sheets—Sheet 5.

F. H. RICHARDS.
WEIGHING MACHINE.

No. 589,288.  Patented Aug. 31, 1897.

Witnesses:
Chas. D. King.
Fred. J. Dole.

Inventor:
F. H. Richards.

(No Model.) 6 Sheets—Sheet 6.

F. H. RICHARDS.
WEIGHING MACHINE.

No. 589,288. Patented Aug. 31, 1897.

Witnesses:
Chas. D. King
Fred. J. Dole

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,288, dated August 31, 1897.

Application filed February 27, 1897. Serial No. 625,331. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, one object of the invention being to provide, in connection with weighing mechanism embodying a load-receiver, an improved load-supply mechanism comprehending means whereby portions of a mass of material may be separated out, agitated, and force-fed to the load-receiver in a loose unpacked condition.

A further object of the invention is to provide, in connection with weighing mechanism, an improved supply apparatus comprehending a feed-case having an inlet and a discharge opening, and also having two material-supporting plates located one above the other, with their inner ends in overlapping relation, means for supplying material to the upper plate and means for force-feeding the material along the upper plate to the lower plate and there subjecting the material to agitation and force-feeding the same along the lower plate to the discharge-opening of the feed-case.

A further object of the invention is to provide, in a weighing-machine, improved means for controlling the supply of material to the load-receiver, and an improved coöperative means for controlling the discharge of the load from the load-receiver, as will be hereinafter fully described.

A further object of the invention is to provide improved beam mechanism comprehending two oppositely-disposed scale-beams and means carried thereby for effecting a unitary movement of said beams.

In the drawings accompanying and forming part of this specification.

Similar characters designate like parts in all the figures of the drawings.

The framework for supporting the operative parts of the machine may be of any suitable construction, and it is herein shown consisting of the two side frames or columns 2 and 4, rising from the chambered supporting-base 3 and connected together at their upper ends by the top plate 5, which in the present case supports a casing (designated in a general way by H) which constitutes one element of the improved supply apparatus.

The automatic weighing mechanism includes a suitable load-receiver G, in which the loads or charges of material are made up, and that herein shown consists of a bucket G of the well-known "single-chambered" type.

For sustaining the bucket or load-receiver G, I have shown beam mechanism of the "duplex" type, consisting of the two oppositely-disposed scale-beams B and B', fulcrumed on the base 3, as usual, and provided with the well-known knife-edges on the poising side thereof for supporting the bucket.

Each of the scale-beams B and B', which may be of any suitable general construction, comprises two parallel beam-arms located one at each side of the machine and connected together at their outer ends by a counterweighting cross-bar. The two arms of the beam B are designated by 6 and 7, respectively, (see Figs. 2 and 9,) and the two arms of the beam B' are designated by 6' and 7', respectively.

Figure 1:
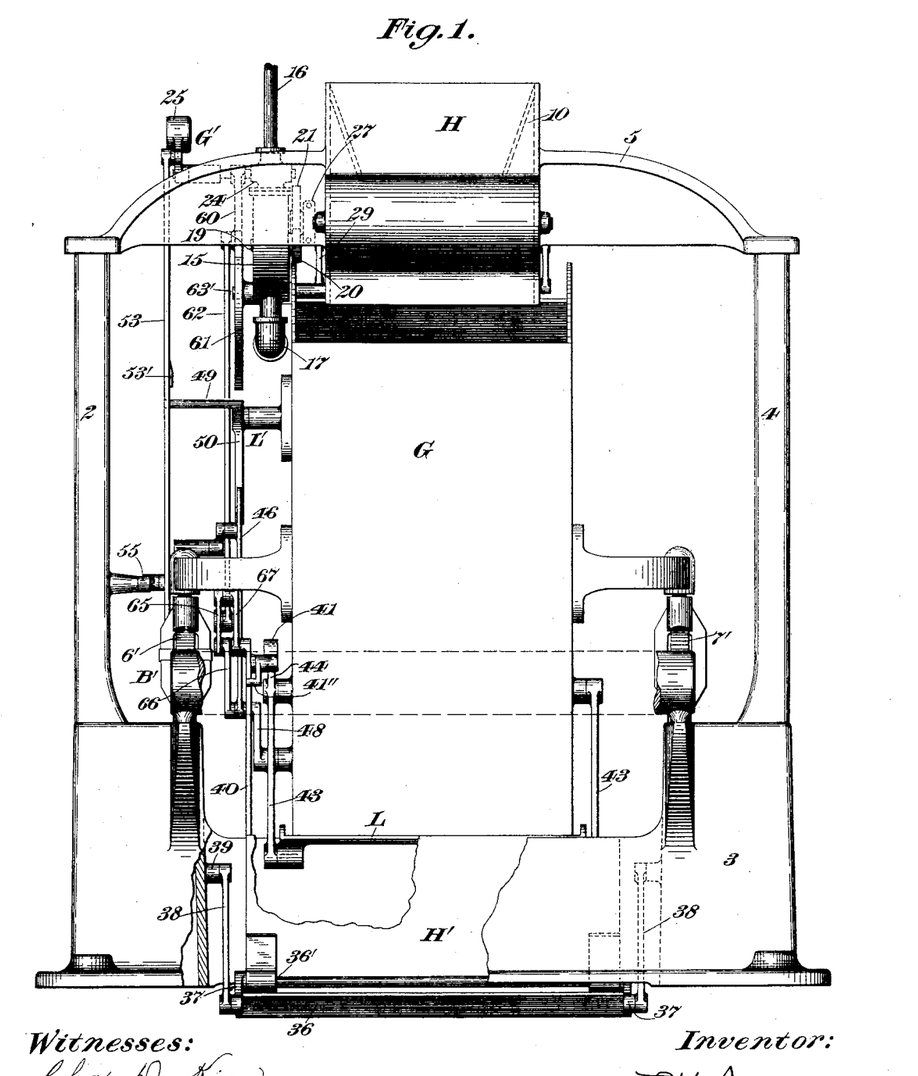
Figure 1 is a front elevation of a weighing-machine embodying my present invention, parts being broken away to illustrate more clearly other elements.
Figure 2:
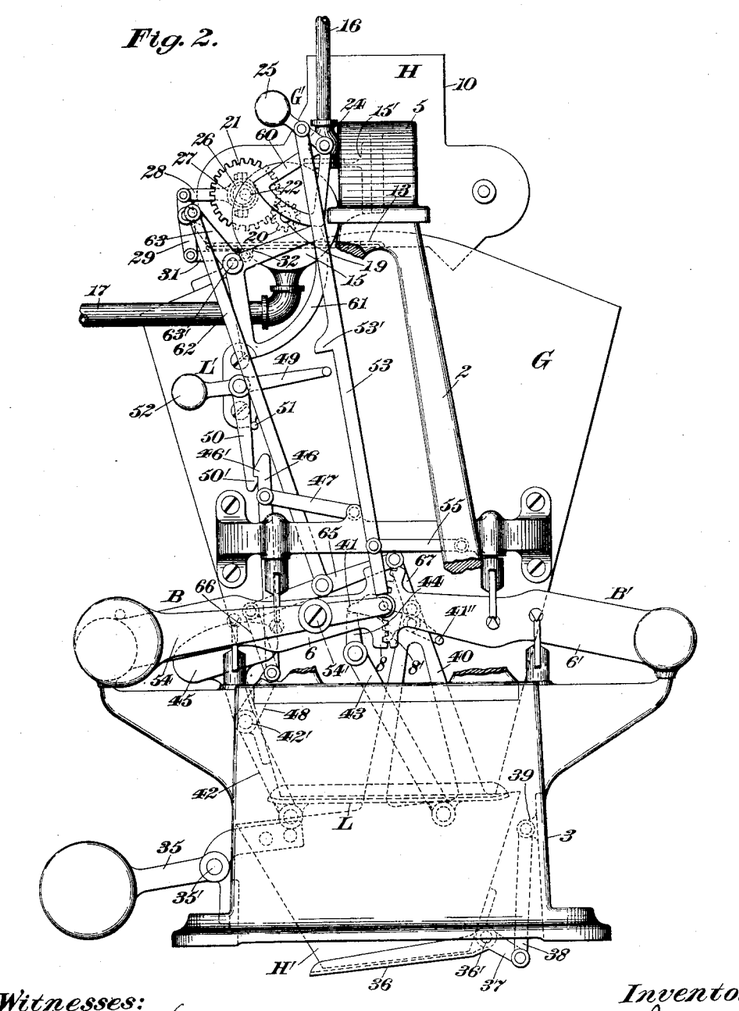
Fig. 2 is a side elevation of the weighing-machine, showing the parts thereof in their normal positions or in the positions they occupy while material is being supplied to the load-receiver and preparatory to the discharge of the load from said receiver, the load-receiver being in its elevated position, the load-discharge member in its closed position, the regulator in its load-receiving position, and the controlling elements of the supply apparatus in the positions they occupy when the feeder is operating.

For the purpose of positively insuring a unitary movement to the two scale-beams B and B' the inner adjacent ends of two of the opposing beam-arms, as 6 and 6', are furnished with toothed segments 8 and 8', which mesh with each other, the pitch-line arc of each segment being concentric to the axis of movement of the scale-beam, as shown most clearly in Fig. 2 of the drawings.

The supply apparatus of the weighing-machine in the preferred form (shown most clearly in Figs. 4, 5, 6, and 10) comprises the feed-case, (designated in a general way by H,) having an inlet and a discharge opening 9 and 9', respectively, preferably located one above the other and out of vertical alinement; a chute 10, communicating with the interior of the feed-case through the inlet-opening thereof; two horizontally-disposed material-supporting plates 12 and 13, respectively, located in the feed-case one above the other, with their inner ends in overlapping relation and in juxtaposition to the inlet and discharge openings 9 and 9', respectively, said lower plate preferably constituting the bottom wall of the feed-case and being supported for reciprocatory movement; an endless openwork feeder (designated in a general way by F) supported for circuitous movement in the feed-case, with the upper run thereof located above the upper material-supporting plate 12 and the lower run located below said plate and in juxtaposition to the lower material-supporting plate 13; feeder-carriers 14 and and 14', supported for rotative movement at opposite ends, respectively, of the feed-case and carrying the endless feeder; a rotary motor (designated in a general way by M) in operative connection with one of said feeder-carriers and adapted for imparting circuitous movement to said carrier, and a motor-governing device (designated in a general way by G') in operative connection with and effective for governing the movements of the motor to start, stop, and control the movements of the feeder.

Figures 4, 5:
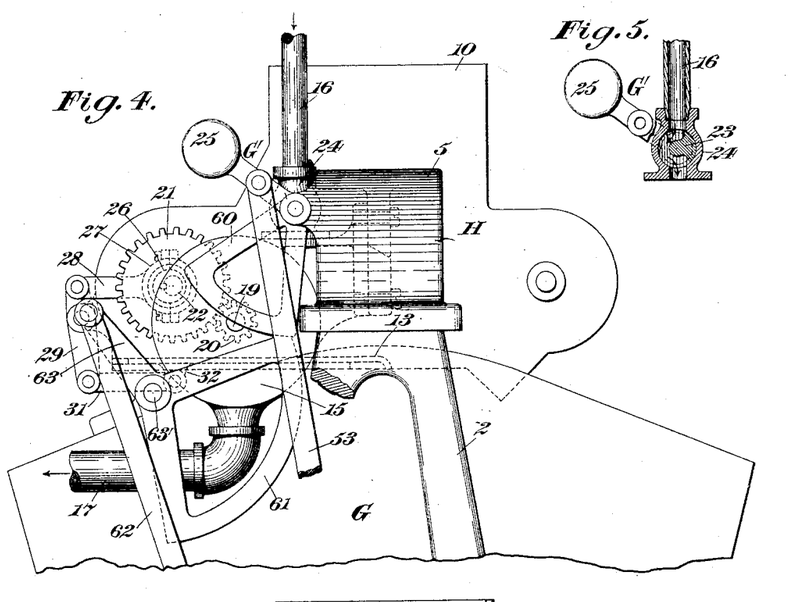
Fig. 4 is a side elevation, on an enlarged scale, of a portion of the upper part of the weighing-machine, showing the feeder-controlling devices in the positions they occupy during the supply of material to the load-receiver, the positions of these parts corresponding to the positions thereof illustrated in Fig. 2.
Fig. 5 is a longitudinal section, partially in elevation, of the motor-controlling device, said figure showing the supply-pipe of the motor and the counterweighted throttle-valve in connection therewith.
Figures 8, 9, 10:
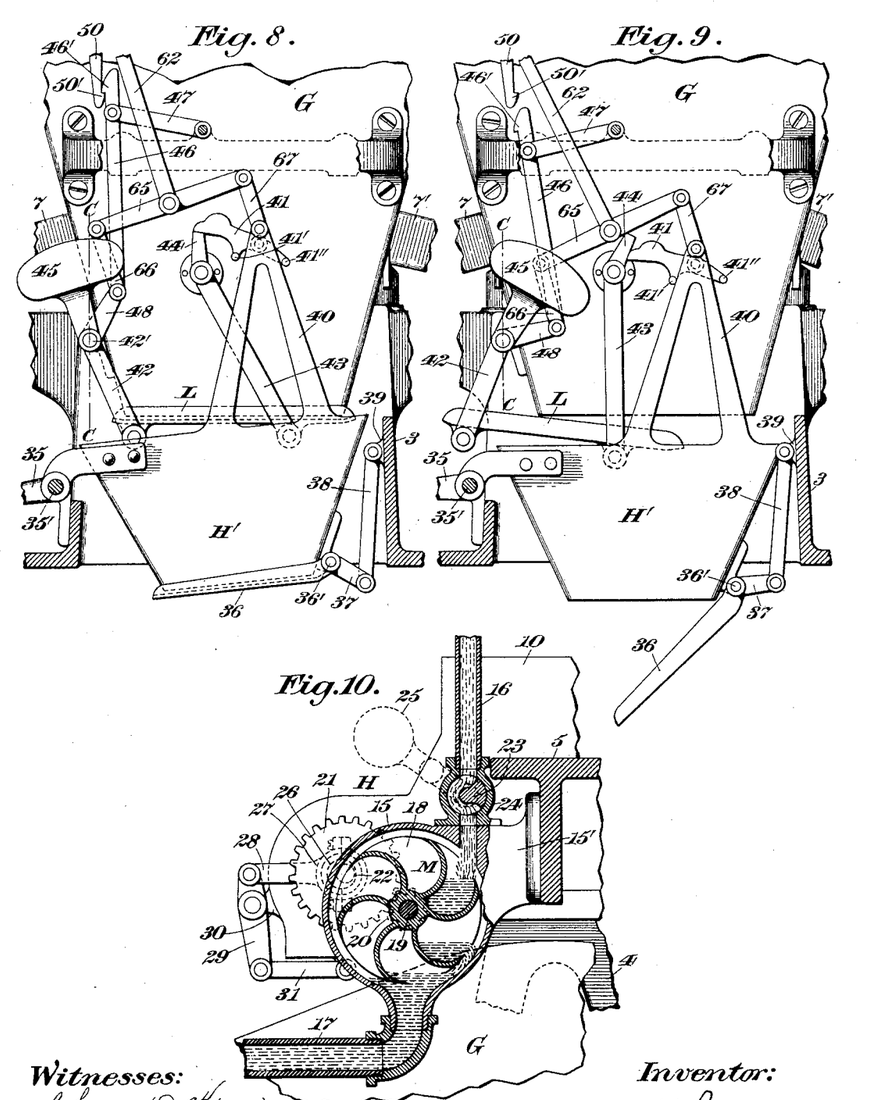
Fig. 8 is a side elevation, partially in section, of a portion of the lower end of the weighing-machine on a scale corresponding to that in Figs. 2 and 3 and showing the closer and regulator and chute device in the same positions illustrated in Fig 2, certain elements being for convenience omitted.
Fig. 9 is a similar side elevation, partially in section, of the parts illustrated in Fig. 8 and shows said parts in the positions they occupy when the closer is in the first stage of its closing movement and the regulator-hopper is on the ascent.
Fig. 10 is a sectional view taken on a line corresponding with the dotted line $b\,b$, Fig. 7, of a portion of the upper end of the weighing-machine, showing the fluid-motor for actuating the feeder and the throttle-valve, which controls the operation of said motor.

The motor M, which may be of any suitable type and which is shown in the nature of a fluid-motor, preferably comprises a cylindrical casing 15, secured to the upper portion of the framework of the machine, preferably by a bracket 15', fixed to the top plate 5, as shown in said Fig. 10; an induction-pipe 16 and an eduction-pipe 17, communicating with the interior of the casing 15; a fluid-driving wheel 18, fixed to a shaft 19, journaled in bearings in the side walls of the motor-case 15 and having at the outer end thereof a pinion 20, which meshes with a spur-wheel 21, fixed to the shaft 22 of one of the rotatable feeder-carriers, as 14; a throttle-valve 23, preferably of the "rotative" type, supported in a valve-chest 24 and having ducts communicating with the induction or feed pipe 16; a counterweighted valve-closing actuator 25, fixed to the outer end of the stem of the valve 23 and operating in a manner hereinafter set forth; an eccentric 26, mounted on the shaft 22 of the feeder-carrier 14 and operatively connected to the reciprocatory material-supporting plate 13, preferably by means of the eccentric-strap 27, surrounding the eccentric, and which has an arm 28, pivotally connected at the outer end thereof to a link 29, which is pivotally supported intermediate its ends on a bracket 30, preferably secured to the feed-case H, and which link 29 is preferably connected at its lower end to an actuating-rod 31, which is in turn pivotally connected to a lug 32, secured to the reciprocatory plate 13, as shown most clearly in Figs. 4 and 10 of the drawings. This eccentric, eccentric-strap, link, and connecting-rod constitute an actuating-connector between the driving-shaft of the feeder and the reciprocatory material-supporting plate 13. It is desired to state in this connection that while it is preferable that one of the material-supporting plates be fixed relatively to the feed-case H, I do not desire to limit myself to the specific construction and organization of the material-supporting plates illustrated in the drawings.

Figure 6:
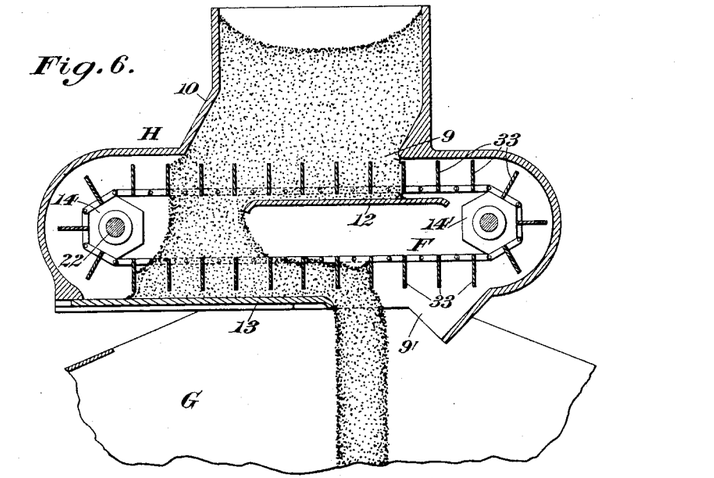
Fig. 6 is a vertical section of a portion of the upper end of the weighing-machine, taken in a line corresponding to the dotted line $a\,a$, Fig. 7, and showing the feed-case, the chute, the material-supporting tables located in the feed-case, and the endless feeder for controlling the supply of material to the load-receiver.
Figure 7:
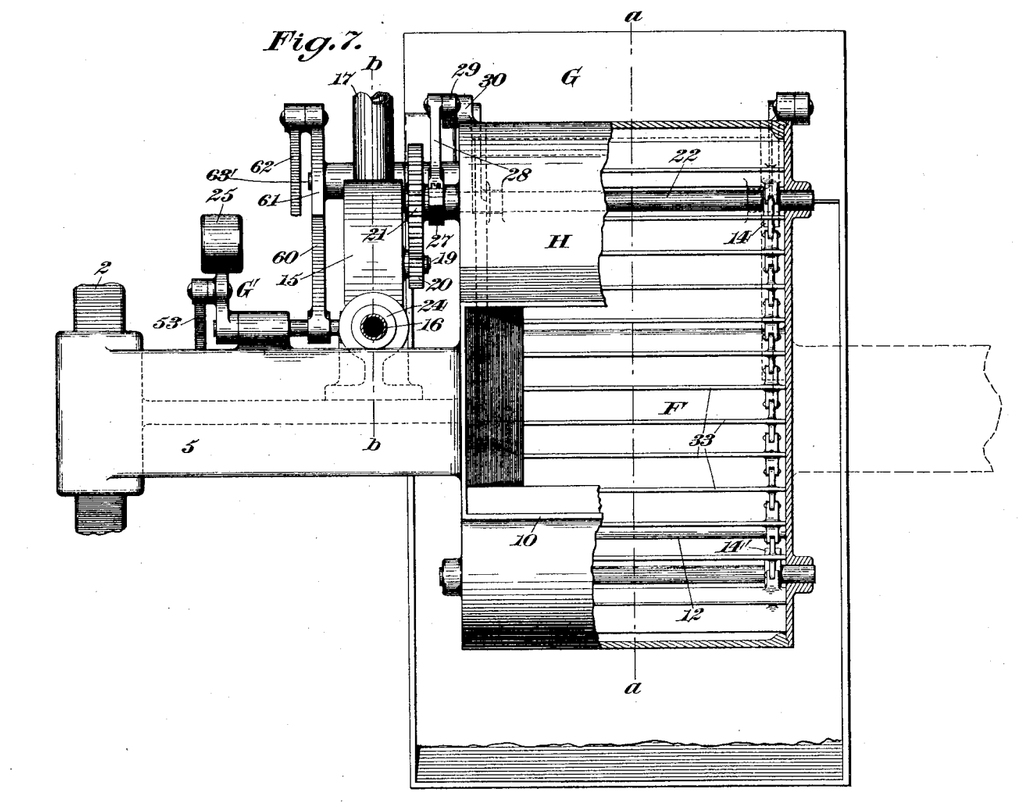
Fig. 7 is a plan view, partially in section, of that portion of the machine shown in Fig. 4.

The feeder F in the preferred form thereof shown most clearly in Figs. 6 and 7 of the drawings is in the nature of an endless chain having a series of remotely-disposed blades 33, set up edgewise, preferably at right angles to the line of circuitous movement of the feeder. In other words, the feeder is composed of a series of plates having laterally-disposed lugs at opposite ends thereof which are pivotally connected together to form an endless chain which extends over the rotative carriers or chain-wheels 14 and 14', as shown in said Figs. 6 and 7, the plates being so disposed relatively to one another as to provide a space of suitable area between adjacent plates through which material may readily flow, as indicated in Fig. 6.

The upper material-supporting plate 12 is located a sufficient distance below the upper wall of the feed-case H as to permit the free movement of the upper run of the endless feeder between said plate and the upper wall of said feed-case. This plate 12 is shown extending across the inlet-opening of the feed-case a distance equal to about two-thirds of the entire width of said opening. This particular arrangement of the material-supporting plate 12 may of course be modified without departure from this invention. The main purpose of said plate is to support the major portion of the material located in the chute 10 and to prevent the direct passage of said material to the load-receiver of the weighing mechanism. During the operation of the feeder F through the medium of the motor M the material as it passes from the supply-chute 10 onto the material-supporting plate 12 through the upper run of the feeder F is separated from the superposed mass and advanced along the upper face of the plate 12, whence it descends through the lower run of the feeder onto the lower reciprocatory material-supporting plate 13, where it is subjected to agitation by the reciprocatory movement of said plate, and is, during such agitation, advanced along the upper face of said plate to the discharge end thereof, whence it passes through the discharge-opening of the feed-case H into the load-receiver in a disseminated or loosened condition.

The feeder-actuating motor is controlled in its movement by certain elements of the weighing mechanism, as will be hereinafter described.

The discharge-opening of the load-receiver G is shown in the present case in substantial vertical alinement with the longitudinal axis of said receiver, and as a convenient means for controlling the discharge of the load from the load-receiver I have provided in coöperative relation with the discharge end of said load-receiver load-discharge-controlling means, which in the organization thereof shown most clearly in Figs. 2, 3, 8, and 9 of the drawings comprises two coöperative mechanisms, which for convenience are herein termed the "regulator" mechanism and the "load-discharge" mechanism.

The regulator mechanism comprises a regulator or regulator-hopper H', located below the discharge-opening of the receiver and in position to receive the load from said receiver, said regulator being carried at the inner end of a counterweighted lever 35, fulcrumed near the inner end thereof at 35' on the base 3 of the machine, a regulator-closer 36, consisting, preferably, of a substantially flat plate pivotally supported at one end thereof, as at 36', on the lower side edge of the regulator-hopper in position for closing the discharge-opening of said hopper, and said closer being pivotally connected by means of a toggle to the base 3 of the machine, said toggle comprising two pivotally-connected members 37 and 38, one of which is in the nature of a crank-arm fixed to the regulator-closer, and the other of which is in the nature of a link pivotally connected at its lower end to the outer end of the crank-arm, and at its outer end to a lug or bracket 39 on the interior of the chambered base 3, the toggle being so disposed that when the regulator-hopper is in its open position (shown in Fig. 3) the pivotal point of said toggle will be in close proximity to their dead-center positions, so that a slight weight of material upon the free end of the regulator-closer will hold said closer open and thereby prevent the ascending movement of the regulator, the function of the regulator-closer 36 and connected toggle being to prevent the return movement of the regulator until the load passing from the load-receiver has been entirely discharged through the regulator-hopper.

Extending upward from one side of the regulator-hopper is an upright or bracket 40, to the upper end of which is pivotally secured a discharge-member-actuating by-pass 41, having stop abutments or projections 41' and 41", located to engage opposite sides of the bracket 40 and to thereby limit the rocking movement of the by-pass. The operation of the by-pass will be hereinafter fully described.

The load-discharge mechanism in the preferred form thereof illustrated in Figs. 2, 3, 8, and 9 comprises in part a load-discharge member or receiver-closer L. This load-discharge member, which is in the nature of a flat plate, is suspended from the load-receiver by means of two sets of discharge-member-supporting links 42 and 43, pivotally connected at their lower ends to opposite ends, respectively, of the closer and pivotally connected at their upper ends to the load-receiver, one by means of a rock-shaft 42', to a bracket secured to the rear wall of the receiver and the other to the side wall of said receiver at a point intermediate the rear wall and the longitudinal axis of said receiver and out of alinement with the center of gravity of the load-discharge member, this latter set of links being preferably considerably longer than the former set of links and one of said links having a crank-arm 44, extending upward from the upper pivotal point thereof, which constitutes a discharge-member-actuating arm, the upper end of which arm is located in position to be engaged by the discharge-member-actuating by-pass 41 on the ascending movement of the regulator H', which inaugurates the closing movement of said discharge member, as will be hereinafter more fully described.

The link 42 is furnished at the upper end thereof with a counterweighted actuator 45, which is fixed to the rock-shaft of said link 42 and is adapted to continue the opening and closing movements of the discharge member L after the same has arrived at predetermined positions.

Figure 3:
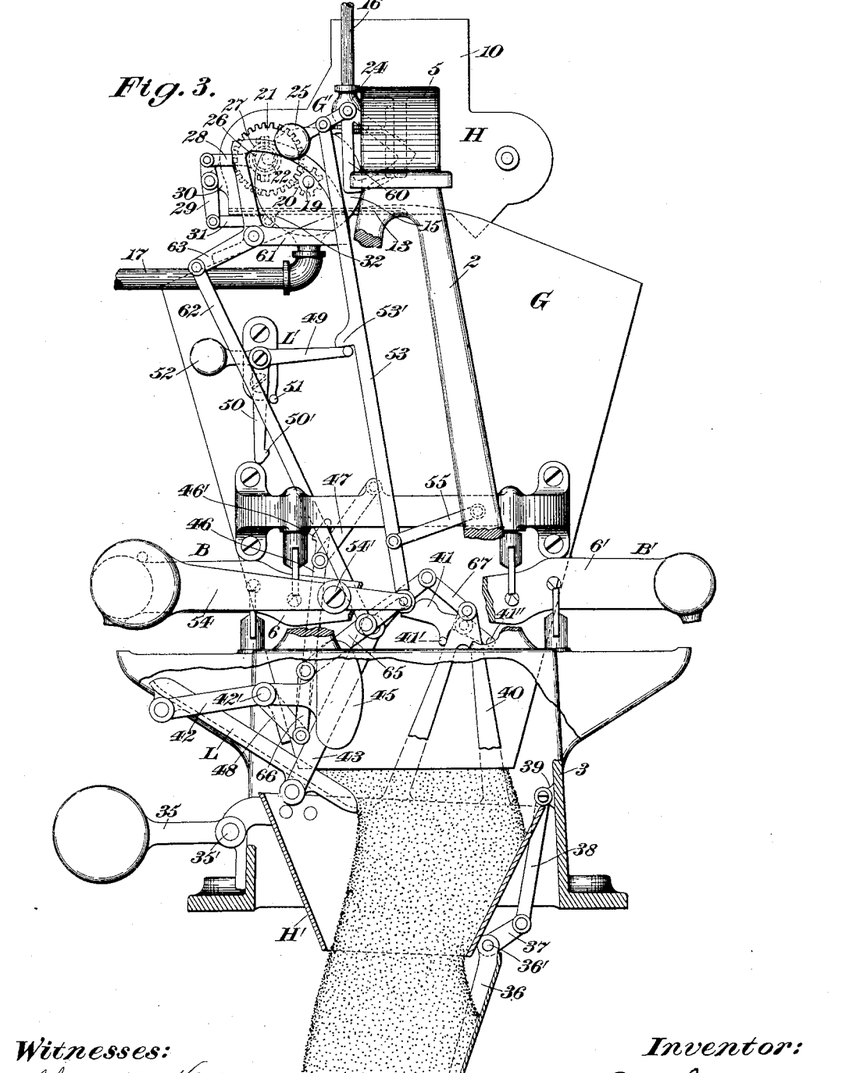
Fig. 3 is a similar side elevation of the weighing-machine showing the parts thereof in the positions they occupy during the discharge of the load from the load-receiver, the load-discharge member being shown in its fully-opened position and the regulator-hopper being shown in its depressed position, with the closer thereof wide open.

As a means for normally locking the load-discharge member in its closed position I have provided a locking device which, in the preferred form most clearly shown in Figs. 2 and 3 of the drawings, comprises a counterweighted latch (designated in a general way by L') pivotally supported on the load-receiver and a catch 46, which is in the nature of a vertically-adjustable arm having a hook 46' at the upper end thereof, and is pivotally connected at the upper end by means of a link 47 to the load-receiver and is pivotally connected at the lower end by means of a crank-arm 48 to the rock-shaft of the link 42 of the load-discharge member.

The latch L' preferably comprises two rectangularly-disposed arms 49 and 50, the one, 50, of which depends from the pivotal point of the latch and is furnished with a hook 50' at the lower end thereof in position for engaging the hook 46' of the catch 46 when the load-discharge member is closed, (see Figs. 2 and 8 of drawings,) a stop 51 being provided for limiting the movement of the latch, and said latch also having a counterweight 52, which is so disposed as to retain the arm 50 normally in its catch-engaging position.

As a means for actuating the latch L' to release the catch and thereby effect an opening movement of the load-discharge member simultaneously with the complete closure of the throttle-valve of the motor M, I have provided, in connection with said throttle-valve, a latch-actuating rod 53, which is pivotally connected at its upper end to the counterweighted valve-closing actuator 25 and is supported at its lower end upon the inner end of a shiftable valve-opening actuator or counterweighted auxiliary beam 54, fulcrumed on one of the scale-beams at 54' and operating with the scale-beam in the usual manner, said latch-actuating rod having a lateral projection 53' in position for engaging the outer end of the arm 49 of the latch L' at a predetermined point in the descending movement of the rod 53 and the closing movement of the throttle-valve 23 of the motor M, to thereby release said latch, the latch-actuating rod being held in operative relation at its lower end with the free end of the shiftable valve-opening actuator 54 by means of a link 55, which is pivotally connected at one end to the rod 53 and at its opposite end to the fixture of the load-receiver.

In the operation of the machine during the descent of the load-receiver and the poising of the beam mechanism the latch-actuating rod 53, which is connected at its upper end to the counterweighted valve-closing actuator 25, moves downward with the beam mechanism and permits the actuator to gradually close the throttle-valve 23, which effects a reduction in the velocity of the feeder F through the medium of the motor M, controlled by said throttle-valve. After the rod 53 arrives at a predetermined point in the descending movement thereof the projection 53' thereon engages the arm 49 of the latch, releasing the arm 50 of said latch from engagement with the catch 46, which permits the load-discharge member L to partially open through the weight of the load resting on the discharge member in advance of its center of gravity.

Immediately upon the release of the latch-arm 50 from the catch 46 the weight of the material on the load-discharge member L will shift said member a sufficient distance to carry the counterweighted actuator 45 thereof from the position shown in Fig. 8 to a point slightly in advance of the dead-center line, (designated by c c, Figs. 8 and 9,) after which the counterweight of the actuator 45 will continue the opening of the load-discharge member, shifting the same from the position shown in Fig. 9 to the position thereof shown in Fig. 3, where it remains in this wide-open position until the closer of the regulator H' is in the first stage of its closing movement and the regulator is returning to its normal elevated position.

During the ascendency or return movement of the regulator H' the free end of the discharge-member-actuating by-pass 41 will abut against the side face of the actuating-arm 44 and operate to impart a rotative movement to said arm and thereby inaugurate the closing movement of the discharge member, as will be understood by a comparison of Figs. 2, 9, and 3 of the drawings.

By reference to Figs. 3, 9, and 8 of the drawings it will be seen that the regulator H', and consequently the abutting end of the by-pass 41, moves in the arc of a circle concentric to the axis 35' of said regulator, and that during the ascending movement of said regulator the free end of the by-pass moves upward and backward toward the vertical plane of the axis of the crank-arm 44 and progressively moves the actuating-arm, together with the discharge member in connection therewith, from the position shown in Fig. 2 to the position shown in Fig. 9, and thence to a position where the counterweighted actuator 45 will be located somewhat in the rear of the dead-center line c c, after which the counterweight of the actuator will complete the closing movement of the load-discharge member.

During the ascending or return movement of the regulator H the free end of the by-pass 41 will be moved upward along the side face of the crank-arm 44 and will arrive at and pass over the upper end of said crank-arm at about the time the counterweighted actuator 45 becomes effective for completing the closing movement of the load-discharge member, and when said crank-arm arrives approximately in a vertical position the continued upward and rearward movement of said bypass causes the same to ride over the upper free end of the crank-arm, tilting the same to the position shown in Fig. 8, with the stop 41' thereof out of contact with the bracket 40, so that on the next descent of the load-receiver the free end of the by-pass may descend with its under face still in contact with the upper face of the crank-arm 44. This leaves the by-pass in position to have a limited amount of free upward movement after the load-discharge member opens and the regulator H' is descending, as is necessary to insure a return movement of the by-pass from the position shown in Fig. 8 to that shown in Figs. 9 and 3, as will be understood when the curvilinear movement of the by-pass axis and regulator is taken into consideration.

During the closing movement of the load-discharge member the catch 46 is elevated and the hook 46' thereof reëngages the hook 50' on the depending latch-arm 50 simultaneously with the complete closure of the load-discharge member, as will be readily understood by comparison of the several figures of the drawings.

As a means for blocking the opening movement of the throttle-valve until the regulator-closer is fully closed and the regulator has returned to its normal elevated position and until the load-discharge member is in its fully-closed position and for blocking the opening movement of the load-discharge member until the throttle-valve which controls the motor M is in its fully-closed position I have provided coöperative stop devices 60 and 61, one of which, as 60, is carried on the stem of the valve 23 and is operative with said valve, and the other of which, as 61, is pivotally supported on the bucket and is operatively connected with the load-receiver, each of said stop-devices embodying segmental or parti-circular members having a stop-face in concentric relation with the axis of movement of said stop. These stop devices or members 60 and 61 are so disposed relatively to each other that when the throttle-valve 23 is in its closed position and the load-discharge member is in its open position the end face of the stop-face of stop 60 will abut against the end of the stop member 61 and will block the closing movement of the valve 23, and when the valve 23 is in its open position and the load-discharge member is in its closed position the stop-face of the stop 60 will bear against the upper end of the stop member 61 and block the opening movement of the closer.

As a connecting means between the stop member 61 and the closer L, I have provided a stop-member actuator 62, which is pivotally connected at its upper end to a crank-arm 63 on the rock-shaft 63' of the stop member 61 and is pivotally connected at its lower end to a link or rock-beam 65 near the middle portion of said link, which in turn is pivotally connected at its rearward end by means of a link 66 to the crank-arm 48, fixed to the rock-shaft of the closer-actuator 45, and is pivotally connected at the opposite end thereof by means of a link 67 to the upper end of a bracket 40 on the regulator H'.

During the return movement of the regulator H' and the closing movement of the load-discharge member L the linkage, constituting the three links 65, 66, and 67, will be shifted from the positions thereof shown in Fig. 3 to the positions shown in Fig. 2, which will raise the stop-member actuator 62 and shift the stop member from the valve-blocking position shown in Fig. 3 to that shown in Fig. 2, whereupon the auxiliary beam or valve-opening actuator 54 will move from the position shown in Fig. 3 to that shown in Fig. 2, thus imparting an upward thrust to the valve-actuating rod 53 and shifting the valve-actuator 25, connected to the upper end of said rod, to a position for opening the throttle-valve 23.

Thus it will be seen that the opening movement of the throttle-valve 23 is dependent upon the combined return movements of the regulator H' and the load-discharge member L' and that said valve cannot open until the regulator-hopper is in its elevated or load-receiving position and the load-discharge member is fully closed, which closure of the load-discharge member is dependent upon the return movement of said regulator.

During the opening movement of the load-discharge member and the descending movement of the regulator H' this operation of the stop member 61 is reversed, as will be readily understood.

Having described my invention, I claim—

1. In a weighing-machine, the combination, with beam mechanism and with a load-receiver supported thereon and having a gravitative closer, of a feed-case located above the load-receiver and having an inlet and a discharge opening located one above and at one side of the other; two superposed horizontal material-supporting plates having their inner ends in juxtaposition to the inlet and discharge openings, respectively; an endless open-work feeder supported in the feed-case with the upper run thereof above the upper plate and with the lower run thereof between the two plates; a motor in operative connection with, and adapted for imparting a circuitous movement to, said feeder, whereby the material is force-fed to the end of the upper plate and is allowed to gravitate through the two runs of the feeder and fall upon the lower plate, whence it is moved along this plate to the discharge-opening of the feed-case; and means controlled by the beam mechanism on the descent of the load-receiver for stopping the motor and for starting the same on the shutting of the closer.

2. In a weighing-machine, a supply apparatus comprehending a feed-case having an inlet and a discharge opening, the former of which is located above and at one side of the latter; two horizontal parallel material-supporting plates, located one above the other, with their inner ends in juxtaposition to the inlet and discharge openings, respectively, and in overlapping relation, and one of which plates is movably supported; an endless open-work feeder having the upper and lower runs thereof located, respectively, above and below the upper table; and means for imparting a circuitous movement to the feeder whereby material supported upon the upper table is advanced to the end of said table and permitted to gravitate through the two runs of the feeder and fall upon the lower table, whence it is conveyed to the end of said lower table and allowed to pass through the discharge-opening of the feed-case; and means for reciprocating the movable table during the operation of the feeder.

3. In a weighing-machine, the combination, with beam mechanism and with a load-receiver supported thereon and having a gravitative closer, of a feed-case having an inlet and a discharge opening the former of which is located above the latter; two horizontally-parallel material-supporting plates located one above the other with their inner ends in juxtaposition to the inlet and discharge openings, respectively, and one of which plates is supported for reciprocatory movement; an endless feeder supported in the feed-case and having a series of remote blades set up edgewise in a plane transversely to the path of movement of the feeder and adapted for force-feeding the material along the two plates in two independent oppositely-moving streams and permitting the gravitation of said material between the blades of the feeder and through the two runs from one to the other plate; a motor in connection with the feeder and reciprocatory plate and adapted for simultaneously imparting a circuitous movement to the feeder and a reciprocatory movement to said plate; and means controlled by the beam mechanism and the closer of the load-receiver for stopping the motor on the descent of the beam mechanism and for starting the same on the shutting of the closer.

4. In a weighing-machine, the combination, with beam mechanism and with a load-receiver supported thereon, of a feed-case located above the load-receiver and having an inlet and an outlet opening and also having a series of superposed material-supporting plates located with their adjacent ends in juxtaposition to the inlet and outlet openings, respectively; an endless feeder located in said feed-case and effective for force-feeding material along the supporting-plates and crosswise of the inlet and discharge openings; and a motor in operative connection with the feeder and one of said plates, and controlled by the beam mechanism, for simultaneously actuating the feeder and reciprocating said plate.

5. The combination, with weighing mechanism including a load-receiver having a shiftable closer, of a feed-case located above the receiver and having an inlet and a discharge opening; a horizontally-disposed material-supporting plate shiftably supported in the feed-case below the opening thereof; a chute in communication with the feed-case; a horizontally-disposed feeder supported in the feed-case and operable for separating out portions of the mass lying on the table and for force-feeding the same over the end of said table; a rotary feeder-actuator controlled by the movements of the weighing mechanism; and means in connection with the feeder-actuator and effective, during the operation of said feeder, for simultaneously reciprocating said plate.

6. In a weighing-machine, the combination, with oscillatory beam mechanism and with a load-receiver supported thereon having a shiftable closer, of a feed-case located above the receiver and having an inlet and a discharge opening and also having two superposed material-supporting plates located therein adjacent to the inlet and discharge openings, respectively; an endless open-work feeder supported in the feed-case with one run thereof above and in position to force-feed material along the upper supporting-plate; a motor in operative connection with and effective for imparting a circuitous movement to the feeder; a motor-governing device controlled by the beam mechanism and by the closer, for stopping the motor on the descending movement of the beam mechanism and for starting the same on the shutting of the closer; and means controlled by the motor, for reciprocating one of said plates simultaneously with the operation of the feeder.

7. In a weighing-machine, the combination, with beam mechanism and with a load-receiver supported on said beam mechanism and having a shiftable closer, of a feed-case located above the receiver and having an inlet and a discharge opening and also having a material-supporting plate located therein adjacent to the inlet-opening thereof; a feeder located in the feed-case in position to force feed material along, and over the end of, the supporting-plate and so constructed that material may gravitate through said feeder in a plane transverse to the line of movement thereof; a feeder-actuating motor in operative connection with said feeder and embodying a governing device; means controlled by the beam mechanism, on the ascending and descending movements thereof, for actuating the governing device to stop and start the motor; two coöperative and reciprocally-effective stop devices controlled by the closer and motor-governing device, respectively, and effective for blocking the operation of the motor when the closer is in its open position, and for preventing the opening movement of the closer when the motor is operating.

8. In a weighing-machine, the combination, with beam mechanism and with a load-receiver supported on said beam mechanism and having a shiftable closer, of a feed-case located above the receiver and having an inlet and a discharge opening; a reciprocatory material-supporting plate located in said case below the inlet-opening thereof; a feeder supported in the feed-case and operable for force-feeding material along the supporting-plate and adapted for controlling the supply of material to the load-receiver; a rotary fluid-motor in operative connection with the feeder and reciprocatory plate and effective for actuating the feeder and plate simultaneously; a throttle-valve for controlling the movements of the motor; and means controlled by the beam mechanism and closer, on certain movements thereof, for actuating the throttle-valve to start and stop the motor.

9. In a weighing-machine, the combination, with beam mechanism and with a load-receiver supported on said beam mechanism and have a shiftable closer, of a feed-case located above the receiver and having an inlet and a discharge opening; a reciprocatory material-supporting plate located in the feed-case adjacent to and below the inlet-opening thereof; a feeder supported in the feed-case for circuitous movement and effective for force-feeding material along the supporting-plate and adapted for controlling the supply of material to the load-receiver; a rotary fluid-motor in operative connection with the feeder and the reciprocatory plate and embodying a throttle-valve for controlling the movements of said motor; a throttle-valve actuator operatively connecting said valve and beam mechanism; and two coöperative stop devices controlled by the closer and throttle-valve, respectively, and reciprocally effective for blocking the motor-starting movement of the valve when the closer is in its open position and for blocking the opening movement of the closer when the throttle-valve is open.

10. The combination, with weighing mechanism, of a casing having an inlet and a discharge opening; an endless-chain feeder supported within the casing, with the upper and lower runs thereof in horizontal planes, and composed of a series of remotely-disposed scraper-blades set up edgewise at right angles to the line of movement to the feeder; means for supporting and facilitating a circuitous movement to the feeder; a fixed horizontally-disposed material-supporting plate located below and in juxtaposition to the upper run of the feeder; a reciprocatory material-supporting plate located below and in juxtaposition to the lower run of said feeder and having its inner end below and between the inner and outer ends of the upper plate; a rotary motor in operative connection and effective for imparting a circuitous movement to the feeder and, simultaneously, a reciprocatory movement to the lower material-supporting plate, whereby material supported on the upper material-supporting plate is force-fed by the scraper-blades of the upper run of the feeder over the end of said plate, whence it falls through the two runs of the feeder upon the lower reciprocatory plate where it is agitated by the movement of said plate and is simultaneously advanced by the scraper-blade of the lower run of the feeder along this plate to the discharge-opening of the casing; and a throttle-valve controlled by the weighing mechanism, for starting and stopping the motor.

11. In a weighing-machine, the combination, with a casing having an inlet and a discharge opening, of an endless-chain feeder supported within the casing, with the upper run and the lower thereof in horizontal planes, and composed of a series of remotely-disposed scraper-blades set up edgewise at right angles to the line of movement of the feeder; means for supporting and facilitating a circuitous movement of the feeder; a horizontally-disposed material-supporting plate located below and in juxtaposition to the upper run of the feeder; a reciprocatory material-supporting plate located below and in juxtaposition to the lower run of said feeder and having its inner end located below, and between the inner and outer ends of, the upper plate; a rotary motor in operative connection with the feeder and adapted for imparting a circuitous movement to said feeder; and an actuating-connector between the reciprocatory plate and motor and effective, during the operation of said motor, for actuating this plate to agitate the material supported thereon, substantially as described and for the purpose set forth.

12. In a weighing-machine, the combination, with a load-receiver, of a load-discharge member suspended from the load-receiver in such manner that the weight of the load will inaugurate the opening movement of said member; a counterweighted actuator carried on the closer in such position as to continue the opening movement of the closer after the same has arrived at a predetermined position; and means for normally locking the closer in its closed position.

13. In a weighing-machine, the combination, with a load-receiver having a discharge-opening in vertical alinement with the longitudinal axis thereof, of a load-discharge member connected to the load-receiver out of vertical alinement with the center of gravity of said member and adapted to have a partial opening movement imparted thereto by the weight of the load supported thereon; a counterweighted actuator shiftably connected with said closer and effective at a predetermined point in the opening movement of said closer for imparting an opening force thereto; and means for locking the closer normally in its closed position.

14. In a weighing-machine, the combination, with a load-receiver, of two depending sets of links pivotally supported on the load-receiver at one side the longitudinal axis thereof; a load-discharge member pivotally supported at opposite ends thereof to the two sets of links, respectively; and a gravitative actuator fixed to one of said links and effective for completing the opening and closing movements, respectively, of said member.

15. In a weighing-machine, the combination, with a load-receiver, of two sets of links pivotally connected at their upper ends to the load-receiver at one side the longitudinal axis thereof, and one of said links having an arm extending upward beyond the pivotal point thereof; a closer pivotally connected to the lower ends of said links; a gravitative regulator having a discharge-member-actuating by-pass in position to engage the arm of said link during the ascending movement of said regulator and inaugurate the closing movement of the discharge member; a gravitative actuator in connection with another link of said member and effective for continuing the closing movement of the discharge member after the same has arrived at a predetermined point.

16. In a weighing-machine, the combination, with a load-receiver having a shiftable load-discharge member, of a gravitative regulator-hopper having a pivotally-supported closer; a link connecting the closer and the framework of the weighing-machine in such manner that a closing movement will be imparted to the closer on the ascending movement of the regulator; and a load-discharge-member actuator carried by the regulator and adapted, on the ascending movement of the regulator, for imparting a closing movement to said discharge member of the receiver.

17. In a weighing-machine, the combination, with a load-receiver having a shiftable load-discharge member, of a counterweighted gravitative regulator pivotally supported on the framework below the load-receiver and having a shiftable closer; a toggle device pivotally connecting the closer and framework and effective, on the rising and falling movements of the regulator, for imparting an opening and closing movement to the regulator-closer; and means carried by the regulator and effective, on the rising movement thereof, for imparting a closing movement to the load-discharge member of the receiver.

18. In a weighing-machine, the combination, with a load-receiver having a shiftable load-discharge member, of a counterweighted gravitative regulator pivotally supported on the framework below the load-receiver and having a shiftable closer; a toggle device pivotally connecting the closer and framework and effective, on the rising and falling movements of the regulator, for imparting an opening and closing movement to the closer; means carried by the regulator and effective, on the rising movement thereof, for inaugurating a closing movement of the load-discharge member; and a shiftable gravitative actuator in connection with the load-discharge member and effective for continuing the closing movement of said member.

19. The combination, with weighing mechanism embodying a load-receiver, of two sets of links pivotally mounted on the load-receiver at one side the longitudinal axis thereof; a load-discharge member pivotally connected at one end to one set of links and at the opposite end to the other set of links; a gravitative regulator pivotally supported below the load-receiver and having a toggle-actuated closer; a counterweight for imparting a return movement to the regulator; a series of links connecting the regulator and load-discharge member; means carried by the regulator, for inaugurating the closing movement of the load-discharge member; a gravitative actuator carried by the load-discharge member and effective at a predetermined point in the closing movement thereof for continuing said closing movement; and a latch mechanism for locking the load-discharge member normally in its closed position.

20. In a weighing-machine, the combination, with a load-receiver, of a shiftable discharge member; a gravitative regulator pivotally supported below said receiver and embodying means for inaugurating the closing movement of the load-discharge member; and means carried by the load-discharge member for continuing such closing movement.

21. In a weighing-machine, the combination, with a load-receiver having a shiftable load-discharge member, of a gravitative regulator-hopper supported on the framework of the machine below said discharge member; a counterweight in connection with said regulator and effective for imparting a return movement thereto; a closer pivotally supported on the regulator; two pivotally-connected links one of which is pivoted to the closer and the other of which is pivotally connected to the framework, and which links are so disposed as to block the closing movement of the closer and the ascending movement of the regulator when material is passing through said regulator, and are adapted for effecting a closing movement of the closer on the ascending movement of the regulator; and means carried by the regulator and effective, on the ascending movement thereof, for inaugurating the closing movement of the discharge member of the load-receiver.

22. The combination, with weighing mechanism embodying a load-receiver having a shiftable load-discharge member and with a gravitative closer, of duplex linkage pivotally connecting the load-discharge member and regulator; stream-supply means embodying a motor having a throttle-valve; and coöperative and reciprocally-effective stop devices, one of which is carried by the throttle-valve and is actuated by a lever on the beam mechanism, and the other of which is operatively connected with the duplex linkage and is effective, on the closing movement of the regulator and load-discharge member, for blocking the opening movement of said valve.

23. In a weighing-machine, the combination, with a load-receiver, of a load-discharge member suspended from said load-receiver; a shiftable gravitative actuator in connection with the load-discharge member; and means for shifting said actuator beyond its dead-center position to complete the closing and opening movements of the load-discharge member.

FRANCIS H. RICHARDS.

Witnesses:
F. N. CHASE,
ANDREW FERGUSON.